(12) United States Patent
Cantrell et al.

(10) Patent No.: US 10,577,103 B2
(45) Date of Patent: Mar. 3, 2020

(54) SYSTEMS AND METHODS FOR DISPENSING AN INSECTICIDE VIA UNMANNED VEHICLES TO DEFEND A CROP-CONTAINING AREA AGAINST PESTS

(71) Applicant: Walmart Apollo, LLC, Bentonville, AR (US)

(72) Inventors: Robert L. Cantrell, Herndon, VA (US); John P. Thompson, Bentonville, AR (US); David C. Winkle, Bella Vista, AR (US); Michael D. Atchley, Springdale, AR (US); Donald R. High, Noel, MO (US); Todd D. Mattingly, Bentonville, AR (US); Brian G. McHale, Greater Manchester (GB); John J. O'Brien, Farmington, AR (US); John F. Simon, Pembroke Pines, FL (US)

(73) Assignee: Walmart Apollo, LLC, Bentonville, AR (US)

( * ) Notice: Subject to any disclaimer, the term of this patent is extended or adjusted under 35 U.S.C. 154(b) by 158 days.

(21) Appl. No.: 15/697,860

(22) Filed: Sep. 7, 2017

(65) Prior Publication Data

US 2018/0065747 A1    Mar. 8, 2018

Related U.S. Application Data

(60) Provisional application No. 62/384,843, filed on Sep. 8, 2016.

(51) Int. Cl.
*B64D 1/18* (2006.01)
*B64C 39/02* (2006.01)
(Continued)

(52) U.S. Cl.
CPC ............... *B64D 1/18* (2013.01); *A01B 79/02* (2013.01); *A01M 7/00* (2013.01); *B64C 39/024* (2013.01);
(Continued)

(58) Field of Classification Search
None
See application file for complete search history.

(56) References Cited

U.S. PATENT DOCUMENTS

| 1,001,135 A | 8/1911 | Gilmore |
| 1,002,629 A | 9/1911 | Berger |

(Continued)

FOREIGN PATENT DOCUMENTS

| CN | 1226919 | 8/1999 |
| CN | 102288606 | 12/2011 |

(Continued)

OTHER PUBLICATIONS

Perry, Caroline; "Robotic insects make first controlled flight"; https://www.seas.harvard.edu/news/2013/05/robotic-insects-make-first-controlled-flight; May 2, 2013; pp. 1-8.

(Continued)

*Primary Examiner* — Richard M Camby
(74) *Attorney, Agent, or Firm* — Fitch, Even, Tabin & Flannery, LLP

(57) ABSTRACT

In some embodiments, methods and systems of dispensing an insecticide to defend a crop-containing area against crop-damaging pests include an unmanned vehicle having a sensor that detects a crop-damaging pest in the crop-containing area and captures pest detection data, and an insecticide output device including at least one insecticide directed at the pest. The unmanned vehicle transmits the captured pest detection data via the network to the computing device and, in response to receipt of the captured pest (Continued)

detection data via the network from the unmanned vehicle, the computing device accesses an electronic database to determine an identity of the at least one pest. Based on the determined identity of the crop-damaging pest, the computing device transmits a control signal to the unmanned vehicle to cause the insecticide output device of the unmanned vehicle to dispense one or more insecticides specific to the identified crop-damaging pest.

20 Claims, 4 Drawing Sheets

(51) Int. Cl.
    *A01B 79/02* (2006.01)
    *A01M 7/00* (2006.01)
    *G05D 1/00* (2006.01)
    *B64C 13/00* (2006.01)

(52) U.S. Cl.
    CPC ............ *G05D 1/0011* (2013.01); *B64C 13/00* (2013.01); *B64C 2201/128* (2013.01); *G05D 2201/0201* (2013.01)

(56) References Cited

U.S. PATENT DOCUMENTS

| | | | |
|---|---|---|---|
| 2,570,511 A | 10/1951 | Blair | |
| 2,685,149 A | 8/1954 | Hvistendahl | |
| 2,775,065 A | 12/1956 | Chepil | |
| 3,514,038 A | 5/1970 | McQuinn | |
| 3,728,817 A | 4/1973 | Huey | |
| 3,774,845 A | 11/1973 | Folkert | |
| 4,087,937 A | 5/1978 | Meador | |
| 4,644,683 A | 2/1987 | Jones | |
| 6,141,904 A | 11/2000 | Greaves | |
| 6,357,171 B1 | 3/2002 | Harper | |
| 6,650,975 B2 | 11/2003 | Ruffner | |
| 6,653,971 B1 | 11/2003 | Guice | |
| 6,671,582 B1 | 12/2003 | Hanley | |
| 6,760,654 B2 | 7/2004 | Beck | |
| 7,656,300 B2 | 2/2010 | Roennau | |
| 9,113,590 B2 | 8/2015 | Johnson | |
| 9,346,545 B2 | 5/2016 | Markov | |
| 9,524,648 B1 | 12/2016 | Gopalakrishnan | |
| 9,532,508 B1 | 1/2017 | Stubbs | |
| 9,550,577 B1 | 1/2017 | Beckman | |
| 9,573,684 B2 | 2/2017 | Kimchi | |
| 9,589,448 B1 | 3/2017 | Schneider | |
| 9,600,997 B1* | 3/2017 | Abrahams | G08B 21/10 |
| 9,678,507 B1 | 6/2017 | Douglas | |
| 9,856,020 B1* | 1/2018 | Gordon | B64D 1/18 |
| 9,913,429 B1 | 3/2018 | Stubbs | |
| 1,001,724 A1 | 7/2018 | Samuel | |
| 2001/0029535 A1 | 10/2001 | Hirano | |
| 2004/0169585 A1 | 9/2004 | Smith | |
| 2008/0111731 A1 | 5/2008 | Hubbard | |
| 2011/0182478 A1 | 7/2011 | Momesso, Jr. | |
| 2012/0042563 A1 | 2/2012 | Anderson | |
| 2013/0047497 A1* | 2/2013 | White | E04B 1/72 43/131 |
| 2013/0068892 A1 | 3/2013 | Bin Desa | |
| 2013/0075484 A1 | 3/2013 | Rhee | |
| 2013/0118066 A1 | 5/2013 | Cope | |
| 2013/0118067 A1 | 5/2013 | Cope | |
| 2013/0156271 A1 | 6/2013 | Cimino | |
| 2014/0053462 A1 | 2/2014 | Wei | |
| 2014/0058881 A1 | 2/2014 | Rosenbaum | |
| 2014/0077969 A1 | 3/2014 | Vian | |
| 2014/0081479 A1 | 3/2014 | Vian | |
| 2014/0303814 A1 | 10/2014 | Burema | |
| 2014/0311014 A1 | 10/2014 | Feugier | |
| 2015/0120094 A1 | 4/2015 | Kimchi | |
| 2015/0187109 A1 | 7/2015 | Mentzer | |
| 2015/0208636 A1 | 7/2015 | David | |
| 2015/0257345 A1 | 9/2015 | Brown | |
| 2015/0277440 A1 | 10/2015 | Kimchi | |
| 2015/0300963 A1 | 10/2015 | Haidekker | |
| 2015/0307191 A1 | 10/2015 | Samuel | |
| 2015/0335004 A1 | 11/2015 | Gale | |
| 2016/0019560 A1 | 1/2016 | Benkert | |
| 2016/0050840 A1 | 2/2016 | Sauder | |
| 2016/0069743 A1 | 3/2016 | McQuilkin | |
| 2016/0070261 A1 | 3/2016 | Heilman | |
| 2016/0071419 A1 | 3/2016 | Heilman | |
| 2016/0073573 A1 | 3/2016 | Ethington | |
| 2016/0157414 A1 | 6/2016 | Ackerman | |
| 2016/0176542 A1 | 6/2016 | Wilkins | |
| 2016/0196755 A1 | 7/2016 | Navot | |
| 2016/0216245 A1 | 7/2016 | Sutton | |
| 2016/0257401 A1 | 9/2016 | Buchmueller | |
| 2016/0260207 A1 | 9/2016 | Fryshman | |
| 2016/0353661 A1 | 12/2016 | Caldeira | |
| 2017/0032686 A1 | 2/2017 | Alonso | |
| 2017/0042102 A1 | 2/2017 | Safreno | |
| 2017/0055511 A1 | 3/2017 | Mafra-Neto | |
| 2017/0069214 A1 | 3/2017 | Dupray | |
| 2017/0110017 A1 | 4/2017 | Kimchi | |
| 2017/0231213 A1 | 8/2017 | Gordon | |
| 2018/0040209 A1 | 2/2018 | Lim | |
| 2018/0064094 A1 | 3/2018 | Cantrell | |
| 2018/0065747 A1 | 3/2018 | Cantrell | |
| 2018/0068164 A1 | 3/2018 | Cantrell | |
| 2018/0068165 A1 | 3/2018 | Cantrell | |
| 2018/0072414 A1 | 3/2018 | Cantrell | |
| 2018/0074499 A1 | 3/2018 | Cantrell | |
| 2018/0074518 A1 | 3/2018 | Cantrell | |
| 2018/0197022 A1 | 7/2018 | Fujikawa | |
| 2018/0259496 A1 | 9/2018 | McPeek | |
| 2018/0293444 A1 | 10/2018 | Buoro | |
| 2019/0073534 A1 | 3/2019 | Dvir | |

FOREIGN PATENT DOCUMENTS

| | | |
|---|---|---|
| CN | 102499061 | 6/2012 |
| CN | 103238513 | 8/2013 |
| CN | 103523225 | 1/2014 |
| CN | 103523234 | 1/2014 |
| CN | 104210660 | 12/2014 |
| CN | 203996897 | 12/2014 |
| CN | 104330410 | 2/2015 |
| CN | 204142639 | 2/2015 |
| CN | 104699111 | 6/2015 |
| CN | 104881865 | 9/2015 |
| CN | 104957033 | 10/2015 |
| CN | 105052408 | 11/2015 |
| CN | 105599899 | 5/2016 |
| CN | 205492255 U | 8/2016 |
| DE | 102009028990 | 10/2010 |
| EP | 3381272 A4 | 10/2018 |
| JP | 2008064681 | 3/2008 |
| JP | 2011200196 | 10/2011 |
| JP | 201223997 | 2/2012 |
| JP | 2013150584 | 8/2013 |
| JP | 2013158288 | 8/2013 |
| JP | 2013226161 | 11/2013 |
| RU | 2588451 | 6/2016 |
| RU | 2620075 | 5/2017 |
| WO | 2010063075 | 6/2010 |
| WO | 2014085774 | 6/2014 |
| WO | 2015103689 | 7/2015 |
| WO | 2015154148 | 10/2015 |
| WO | 2015188831 | 12/2015 |
| WO | 2016065071 | 4/2016 |
| WO | 2016090414 | 6/2016 |

OTHER PUBLICATIONS

"5 ways drones could affect US food supply_ herding cattle and counting fish to scouting farms"; http://www.foxbusiness.com/markets/2015/01/25/5waysdronescouldaffectusfoodsupplyherdingcattleandcountingfishtc.html; Jan. 25, 2015; pp. 1-6.

(56) References Cited

OTHER PUBLICATIONS

"Artificial Intelligence in Agriculture. Part 1: How Farming Is Going Automated With Robots"; http://agrolution.com/author/agrolution/; May 17, 2016; pp. 1-28.
"Robotic Pollinators: An Autonomous Colony of Artificial Bees"; http://www.eecs.harvard.edu/~mdw/private/case/proposals/robobees-2009.pdf; Harvard; 2009; pp. 1-25.
Deepak, Indripi, et al.; "Unmanned Aerial Flying Vehicle (Drone) for Agricultural Inspection and Pollination"; http://kscst.iisc.ernet.in/spp/38_series/spp38s/synopsis_exhibition/123_38S0330.pdf; 2015; 2 pgs.
Garling, Caleb; "Drone, Drone on the Range"; http://modernfarmer.com/2013/07/drones-drones-on-the-range/; Jul. 8, 2013; pp. 1-7.
Lim, Jason; "Drones Being Tested to Fight Against Farm Pests"; http://www.forbes.com/sites/jlim/2015/08/01/dronesbeingtestedtofightagainstfarmpests/#429173de33fe; Aug. 1, 2015; pp. 1-11.
Nicas, Jack; "They're Using Drones to Herd Sheep"; http://www.wsj.com/articles/theyre-using-drones-to-herd-sheep-1428441684; Apr. 7, 2015; pp. 1-5.
PCT; App. No. PCT/US17/49035; International Search Report and Written Opinion dated Nov. 16, 2017.
PCT; App. No. PCT/US17/49041; International Search Report and Written Opinion dated Nov. 16, 2017.
PCT; App. No. PCT/US17/49259; International Search Report and Written Opinion dated Nov. 21, 2017.
PCT; App. No. PCT/US2017/049531; International Search Report and Written Opinion dated Nov. 14, 2017.
PCT; App. No. PCT/US2017/049535; International Search Report and Written Opinion dated Nov. 13, 2017.
PCT; App. No. PCT/US2017/049844; International Search Report and Written Opinion dated Nov. 16, 2017.
Van Vark, Caspar; "Drones set to give global farming a makeover"; http://www.theguardian.com/globaldevelopment/2015/dec/26/dronesfarmingcropproblemsuays; Dec. 26, 2015; pp. 1-4.
Yu, Lim; "Application of Unmanned Aerial Vehicle (UAV) for Inspection of Pollinated Palms"; http://www.jamesdysonfoundation.com/; 2016; 3 pgs.
USPTO; U.S. Appl. No. 15/696,586; Office Action dated Mar. 29, 2019.
USPTO; U.S. Appl. No. 15/696,586; Office Action dated Jul. 8, 2019.
USPTO; U.S. Appl. No. 15/696,586; Office Action dated Oct. 24, 2018.
USPTO; U.S. Appl. No. 15/698,012; Office Action dated Apr. 8, 2019.
USPTO; U.S. Appl. No. 15/698,012; Office Action dated Sep. 3, 2019.
USPTO; U.S. Appl. No. 15/698,306; Office Action dated Apr. 8, 2019.
USPTO; U.S. Appl. No. 15/698,306; Office Action dated Sep. 3, 2019.
USPTO; U.S. Appl. No. 15/697,106; Office Action dated Oct. 11, 2019.

* cited by examiner

SYSTEMS AND METHODS FOR DISPENSING AN INSECTICIDE VIA UNMANNED VEHICLES TO DEFEND A CROP-CONTAINING AREA AGAINST PESTS

CROSS-REFERENCE TO RELATED APPLICATION

This application claims the benefit of U.S. Provisional Application No. 62/384,843, filed Sep. 8, 2016, which is incorporated herein by reference in its entirety.

TECHNICAL FIELD

This disclosure relates generally to defending a crop-containing area from crop-damaging pests, and in particular, to systems and methods for using unmanned vehicles to dispense an insecticide against crop-damaging pests.

BACKGROUND

Monitoring crops and defending crops against crop-damaging pests is paramount to farmers. Methods of protecting crops from crop-damaging pests include scarecrows or other devices mounted in the crop-containing areas that are designed to generically scare away all pests. Scarecrows or reflective tape/foil mounted on or near crops may be able to scare away some pests (e.g., birds), but usually do not have any effect on other pests (e.g., insects), and do not enable the farmers to identify the pest or pests attacking the crops in the crop-containing area. Methods of protecting crops from crop-damaging pests also include chemical spraying designed to drive away and/or kill crop-attacking pests. Chemical sprays typically target one type of pest while not affecting other types of pests. Given that the above anti-pest devices repel, but do not identify the crop-attacking pests, selecting an appropriate chemical anti-pest treatment for the crops can be difficult for the farmers, often forcing the farmers to use multiple chemical sprays as a prophylactic against multiple pests that may attack the crops in the crop-containing area. However, chemical spraying of crops is expensive and may not be looked upon favorably by some consumers.

BRIEF DESCRIPTION OF THE DRAWINGS

Disclosed herein are embodiments of systems, devices, and methods pertaining to dispensing an insecticide via unmanned vehicles to defend a crop-containing area against crop-damaging pests. This description includes drawings, wherein.

Figure 1:
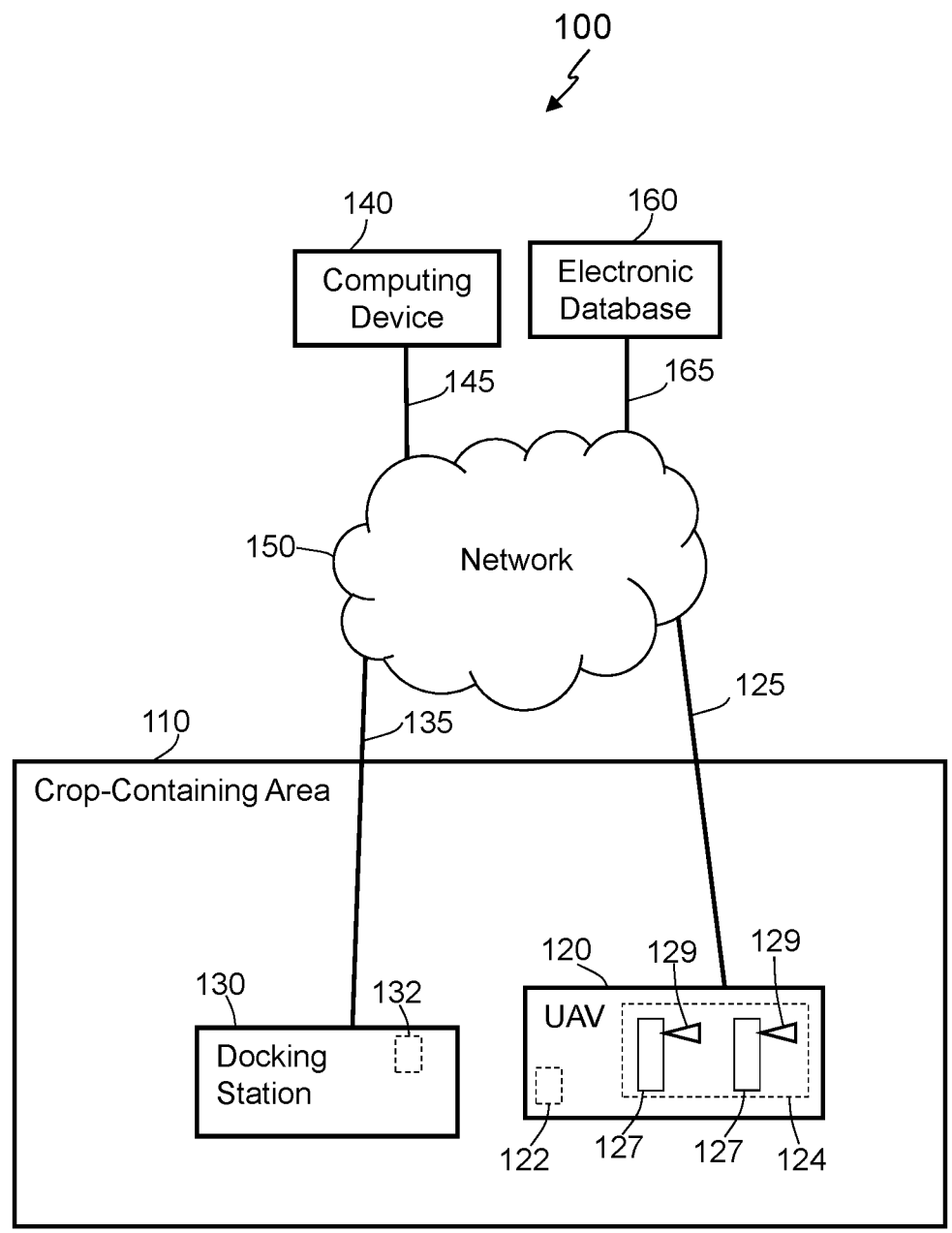
FIG. 1 is a diagram of a system for defending a crop-dispensing an insecticide via unmanned vehicles to defend a crop-containing area against crop-damaging pests in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally, the systems, devices, and methods described herein provide for unmanned vehicles (e.g., unmanned aerial vehicle, autonomous ground vehicles, etc.) configured for detecting crop-damaging pests in the crop-containing area and dispensing an insecticide to defend the crop-containing area against the crop-damaging pests.

In one embodiment, a system for dispensing an insecticide to defend a crop-containing area against crop-damaging pests includes at least one unmanned aerial vehicle having at least one sensor configured to detect at least one pest in the crop-containing area and to capture pest detection data and at least one insecticide output device including at least one insecticide directed at the at least one pest. The system also includes one or more electronic databases including pest identity data associated with one or more crop-damaging pests and a computing device including a processor-based control circuit and configured to communicate with the unmanned aerial vehicle and the electronic database via a network. The unmanned aerial vehicle is configured to transmit the captured pest detection data via the network to the computing device and, in response to receipt of the captured pest detection data via the network from the unmanned aerial vehicle, the computing device is configured to access the pest identity data on the electronic database via the network to determine an identity of the at least one pest. The computing device is configured to transmit, based on the determined identity of the pest by the computing device, a control signal to the unmanned aerial vehicle via the network, with the control signal configured to cause the insecticide output device of the unmanned aerial vehicle to dispense the insecticide.

In another embodiment, a method of dispensing an insecticide to defend a crop-containing area against crop-damaging pests includes: providing at least one unmanned aerial vehicle including at least one sensor configured to detect at least one pest in the crop-containing area and to capture pest detection data and at least one insecticide output device including at least one insecticide directed at the at least one pest; providing at least one electronic database including pest identity data associated with the at least one pest; providing a computing device including a processor-based control circuit and configured to communicate with the at least one unmanned aerial vehicle and the at least one electronic database via a network; transmitting the captured pest detection data from the at least one unmanned aerial vehicle to the computing device via the network; receiving the captured pest detection data from the at least one unmanned aerial vehicle at the computing device via the network; accessing, via the computing device, the pest identity data on the at least one electronic database via the network; determining the identity of the at least one pest via the accessing step; transmitting, from the computing device and based on the determining step, a control signal to the at least one unmanned aerial vehicle via the network; and dispensing, via the at least one insecticide output device of the at least one unmanned aerial vehicle, the at least one insecticide based on the control signal transmitted from the computing device.

FIG. 1 illustrates an embodiment of a system 100 for dispensing an insecticide to defend a crop-containing area 110 against crop-damaging pests. It will be understood that the details of this example are intended to serve in an illustrative capacity and are not necessarily intended to suggest any limitations in regards to the present teachings.

Generally, the exemplary system 100 of FIG. 1 includes a UAV 120 including one or more sensors 122 configured to detect one or more crop-damaging pests in the crop-containing area 110 and capture pest detection data, as well as one or more insecticide output devices 124 configured to eliminate the pest or pests from the crop-containing area 110. It will be appreciated that, in some embodiments, the sensors 122 are configured to detect not only crop-damaging pests, but also animals (e.g., mammals, birds, reptiles, and/or insects) that are not known to cause crop damage. While only one UAV 120 is shown in FIG. 1, it will be appreciated that the system 100 may include two or more UAVs 120 configured to patrol the crop-containing area 110 and to detect and/or eliminate a pest or pests detected in the crop-containing area 110. The system 100 also includes a docking station 130 configured to permit the UAV 120 to land thereon and dock thereto and recharge while patrolling the crop-containing area 110. While only one docking station 130 is shown in FIG. 1, it will be appreciated that the system 100 may include two or more docking stations 130. In addition, while the docking station 130 is shown in FIG. 1 as being located in the crop-containing area 110, it will be appreciated that one or more (or all) docking stations 130 may be positioned outside of the crop-containing area 110. The docking station 130 may be configured as an immobile station or a mobile station. Generally, the UAV 120 is configured to fly above ground through a space overlying the crop-containing area 110, to land onto a docking station 130, and to dock onto the docking station 130 (e.g., for recharging), as described in more detail below.

The exemplary system 100 also includes a processor-based computing device 140 in two-way communication with the UAV 120 (e.g., via communication channels 125 and 145) and/or docking station 130 (e.g., via communication channels 135 and 145) over the network 150, and an electronic database 160 in two-way communication with at least the computing device 140 (e.g., via communication channels 145 and 165) over the network 150. The network 150 may be one or more wireless networks of one or more wireless network types (such as, a wireless local area network (WLAN), a wireless personal area network (PAN), a wireless mesh network, a wireless star network, a wireless wide area network (WAN), a local area network (LAN), a cellular network, and combinations of such networks, and so on), capable of providing wireless coverage of the desired range of the UAV 120 according to any known wireless protocols, including but not limited to a cellular, Wi-Fi or Bluetooth network. In the system 100 of FIG. 1, the computing device 140 is configured to access at least one electronic database 160 via the network 150, but it will be appreciated that the computing device 140 may be configured such that the computing device 140 is directly coupled to the electronic database 160 such that the computing device 140 can access information stored in the electronic database 160 directly and not via the network 150.

It is understood that more or fewer of such components may be included in different embodiments of the system 100. For example, in some embodiments, the docking station 130 is optional to the system 100 and, in such embodiments, the UAV 120 is configured to take off from a deployment station (e.g., stand-alone or vehicle mounted) to initiate patrolling of the crop-containing area 110, and to return to the deployment station without recharging after patrolling the crop-containing area 110. In addition, in some aspects, the computing device 140 and the electronic database 160 may be implemented as separate physical devices as shown in FIG. 1 (which may be at one physical location or two separate physical locations), or may be implemented as a single device. In some embodiments, the electronic database 160 may be stored, for example, on non-volatile storage media (e.g., a hard drive, flash drive, or removable optical disk) internal or external to the computing device 140, or internal or external to computing devices distinct from the computing device 140. In some embodiments, the electronic database 160 is cloud-based.

In some embodiments, the UAV 120 deployed in the exemplary system 100 does not require physical operation by a human operator and wirelessly communicates with, and is wholly or largely controlled by, the computing device 140. In particular, in some embodiments, the computing device 140 is configured to control directional movement and actions (e.g., flying, hovering, landing, taking off, moving while on the ground, dispensing an insecticide, etc.) of the UAV 120 based on a variety of inputs. Generally, the UAV 120 of FIG. 1 is configured to move around the crop-containing area, detect one or more crop-damaging pests in the crop-containing area 110, and eliminate such pests from the crop-containing area 110 via deployment of the insecticide output device 124. While an unmanned aerial vehicle is generally described herein, in some embodiments, an aerial vehicle remotely controlled by a human may be utilized with the systems and methods described herein without departing from the spirit of the present disclosure. In some embodiments, the UAV 120 may be in the form of a multicopter, for example, a quadcopter, hexacopter, octocopter, or the like. In one aspect, the UAV 120 is an unmanned ground vehicle (UGV) that moves on the ground around the crop-containing area 110 under the guidance of the computing device 140 (or a human operator). In some embodiments, as described in more detail below, the UAV 120 includes a communication device (e.g., transceiver) configured to communicate with the computing device 140 while the UAV 120 is in flight and/or when the UAV 120 is docked at a docking station 130.

The exemplary UAV 120 shown in FIG. 1 includes at least one sensor 122 and at least one insecticide output device 124. Examples of some other suitable output devices are discussed in co-pending application entitled "SYSTEMS AND METHODS FOR DEFENDING CROPS FROM CROP-DAMAGING PESTS VIA UNMANNED VEHICLES," filed Sep. 8, 2016, which is incorporated by reference herein in its entirety. Generally, the sensor 122 of the UAV 120 is configured to detect an animal (e.g., a crop-damaging pest such as an insect, bird, or mammal and/or an animal that does not damage crops) in the crop-containing area 110 and the output device 124 is configured to eliminate the detected crop-damaging animal from the crop-containing area 110.

In some embodiments, the sensor 122 of the UAV 120 includes a video camera configured to monitor the crop-containing area 110, detect presence of one or more crop-damaging pests in the crop-containing area 110, and capture pest detection data (e.g., a real-time video of the pest, still image of the pest, sounds made by the pest, crop or soil damage caused by the pest, or the like). In one aspect, the sensor 122 is a radar-enabled sensor configured to detect movement of one or more crop-damaging pests outside of the crop-containing area 110, for example, as such crop-damaging pests are approaching the crop-containing area 110, by air, ground, or sea. In one aspect, the sensor 122 is a motion detection-enabled sensor configured to detect movement of one or more crop-damaging pests in the crop-containing area 110. In some embodiments, the video camera of the UAV 120 is configured to be activated in response to the detection of movement, by the motion sensor, of one or more crop-damaging pests in, or adjacent to, the crop-containing area 110. In some embodiments, the video camera is a visible light camera, infrared camera, thermal camera, and/or a night-vision video camera.

In some embodiments, the sensor 122 may be configured to detect one or more odors in the crop-containing area that are emitted by crop-damaging pests or animals that do not damage the crops. Such odors may include odors emitted by the crop-damaging pests or animals that do not damage the crops, and/or odors emanating by animal droppings located in or adjacent to the crop-containing area 110.

In some embodiments, the insecticide output device 124 of the UAV 120 is configured to eliminate one or more crop-damaging pests (e.g., insects, birds, and/or animals) from the crop-containing area 110. In one aspect, the insecticide output device 124 is configured to emit (e.g., via spray, aerosol, mist, or the like) one or more chemical agents (e.g., insecticide, fungicide, herbicide, or combinations thereof) configured to kill, put to sleep, or repel the crop-damaging pests, plants, or fungi detected in the crop-containing area 110. For example, after a pest detected by the sensor 122 of the UAV 120 in the crop-containing area 110 is identified by the computing device 140, the insecticide output device 124 of the UAV 120 may emit a continuous or intermittent jet, mist, an aerosol, or the like that includes one or more chemical agents aimed at killing, putting to sleep, or repelling the detected pest. Conversely, after an animal (or human) not associated with causing crop damage is detected by the sensor 122 of the UAV 120 in the crop-containing area 110 is identified by the computing device 140, the UAV 120 would not deploy the insecticide output device 124 against such an animal (or human).

In some embodiments, the chemical substance-spraying device includes a cartridge or canister 127 configured to hold a solution including one or more chemicals configured to kill, put to sleep, and/or repel the detected pest away from the crop-containing area 110 upon release of the chemical-containing solution from the canister 127. The exemplary canister 127 is in fluid communication with a nozzle 129 configured to release the chemical-containing solution from the canister 127. It will be appreciated that the chemical solution contained in the canister 127 may be toxic only to one specific pest or family of pests, two specific pests or families of pests, or three or more specific pests or families of pests.

In some embodiments, the chemical solution contained in the canister 127 is a pesticide (e.g., insecticide), herbicide, fungicide, or a combination of one or more thereof. In some aspects, the chemical solution contained in the canister 127 is an organic (e.g., plant-derived) solution that is toxic to certain crop-damaging plants but not toxic to the crops and/or other plants.

The insecticide output device 124 of the UAV 120 includes two canisters 127 each including a chemical agent-containing aerosol directed at a different crop-damaging pest, such that the UAV 120 is equipped to spray chemical agent-containing aerosols directed against multiple crop-damaging pests. It will be appreciated that the insecticide output device 124 can includes more than two pesticide-containing canisters 127 in some aspects. In one aspect, the insecticide output device 124 includes a first canister 127 including a first chemical that is toxic (i.e., that kills, puts to sleep, and/or repels) a first crop-damaging pest identified by the computing device 140, and a second canister 127 including a second chemical that is toxic (i.e., that can kill, put to sleep, and/or repel) a second crop-damaging pest identified by the computing device 140.

In some embodiments, after a pest is detected in the crop-containing area 110 by the UAV 120 and identified by the computing device 140, the UAV 120 can be instructed via a control signal transmitted by the computing device 140 over the network, to spray a chemical agent-containing aerosol that is determined (e.g., by the computing device 140) to be most optimal to kill, put to sleep, or repel the detected and identified pest. In some embodiments, the computing device 140 transmits a signal including only an identification of the pest detected by the UAV 120, and a control circuit of the UAV 120 is programmed to determine, based on the received identity of the pest, which insecticide-containing canister 127 to deploy against such a pest, as well as to send a control signal to the insecticide output device 124 specifying which canister 127 to deploy.

In some embodiments, the insecticide deployed against the crop-damaging pest detected by the UAV 120 and identified by the computing device 140 can be specifically targeted to the identified crop-damaging pest. For example, in one aspect, when one crop-damaging pest is detected and identified in the crop-containing area 110 and the insecticide output device 124 of the UAV 120 includes two or more canisters 127 each including a chemical targeted against one specific crop-damaging pest, the computing device 140 is configured to send, over the network 150 to the UAV 120, a control signal configured to cause the insecticide output device 124 of the UAV 120 to dispense, via a first canister 127, a first chemical targeted against the identified pest without dispensing a second chemical from the second canister 127.

In another aspect, when two crop-damaging pests are detected and identified in the crop-containing area 110 and the insecticide output device 124 of the UAV 120 includes two or more canisters 127 each including a chemical targeted against one specific crop-damaging pest, the computing device 140 is configured to send, over the network 150 to the UAV 120, a control signal configured to cause the insecticide output device 124 of the UAV 120 to dispense, via a first canister 127, a first chemical targeted against the first identified crop-damaging pest and to dispense, via the second canister 127, a second chemical targeted against the second identified crop-damaging pest. As discussed above, in some embodiments, the UAV 120 is not dependent upon the computing device 140 to send such a control signal, but the control circuit of the UAV 120 is programmed to analyze pest detection data captured by the sensors 122 of the UAV 120 to identify the detected crop-damaging pests, and to determine which one or more canisters 127 of the insecticide output device 124 to deploy against the identified crop-damaging pests.

In one aspect, two or more canisters 127 are operatively coupled in fluid communication to a single nozzle 129, such that the single nozzle 129 may be controlled (e.g., by the control unit of the UAV 120 or the control unit of the computing device 140) to selectively spray an insecticide from any one of the canisters 127 coupled to the nozzle 129. In another aspect, two or more canisters 127 are each operatively coupled in fluid communication to their own respective nozzles 129 such that each canister 127 only sprays its respective insecticide only via its own respective nozzle 129.

In some embodiments, the insecticide output device 124 is operatively coupled to a bug zapper, for example, a light- and/or sound-emitting device configured to attract pests and electrocute the pests while making a "zapping" noise by way of a plurality of electrified elements (e.g., formed as a net, mesh, etc.). In one aspect, the bug zapper may be detachably or non-detachably coupled to the housing 202 and to project outwardly therefrom to attract, electrocute and optionally collect electrocuted crop-damaging pests (e.g., insects) while the UAV 120 is in motion during the patrolling of the crop-containing area 110.

In some embodiments, the UAV 120 is configured to send a signal to the computing device 140 (via the wireless network 150) including pest detection data captured by one or more sensors 122 of the UAV 120 upon detection, by the sensors 122, of one or more crop-damaging pests in the crop-containing area 110. In some embodiments, as will be described below, in response to receipt of such a signal from the UAV 120, the computing device 140 is configured to send a signal to the UAV 120 (via the wireless network 150) configured to cause the insecticide output device 124 of the UAV 120 to dispense one or more insecticides targeting the crop-damaging pest or pests detected by the sensors 122 of the UAV 120 in the crop-containing area 110 and identified by the computing device 140.

In some embodiments, one or more sensors 122 of the UAV 120 are configured to detect the presence of at least one type of non-pest crop-damaging factor in the crop-containing area 110 and to capture the characteristics of the presence of such a non-pest crop-damaging factor, which is then analyzed by the computing device 140 to identify the environmental factor responsible for the crop damage, and to determine a set of instructions for the UAV 120 to remedy such a non-pest crop-damaging environmental factor. For example, in one aspect, the non-pest damage to one or more crops detectable by the sensor 122 of the UAV 120 in the crop-containing area 110 includes environmental damage including, but not limited to: fungus presence on leaves, fruits, flowers, or stalks of the crops, presence of dark, rotting spots on the fruits growing on the crops (which may be caused by bacteria, mold, mildew, etc.), unbalanced soil content (e.g., indicated by yellowing or dwarfed leaves, etc.), soil damage and/or erosion causes by rain, drought, wind, frostbite, earthquake, over-fertilization, animals (e.g., deer, gophers, moles, grub worms, etc.), and/or other plants or trees (e.g., crop-damaging plants or weeds such as Kudzu, or poisonous plants such as poison ivy). In some embodiments, after receiving data indicating detection of crop damage attributable to one or more such environmental factors from the UAV 120, the computing device 140 instructs the UAV 120 to deploy one or more remedial measures by dispensing a pesticide (e.g., insecticide), fungicide, and/or herbicide via the insecticide output device 124 against the pest, fungus, and/or plant that is damaging the crops. In one aspect, if soil damage consistent with digging/burrowing mammal or insect pests is detected by the sensor 122 of the UAV 120, the computing device 140 instructs the UAV 120 to deploy one or more predators (e.g., birds such as purple martins, owls, etc., bats, insects such as praying mantis, or certain species of snakes) that would be expected to exterminate and/or scare away the soil damage-causing pests from the affected area.

In some embodiments, as described in more detail below, the sensors 122 of the UAV 120 include one or more docking station-associated sensors including but not limited to: an optical sensor, a camera, an RFID scanner, a short range radio frequency transceiver, etc. Generally, the docking station-associated sensors of the UAV 120 are configured to detect and/or identify the docking station 130 based on guidance systems and/or identifiers of the docking station 130. For example, the docking station-associated sensor of the UAV 120 may be configured to capture identifying information of the docking station from one or more of a visual identifier, an optically readable code, a radio frequency identification (RFID) tag, an optical beacon, and a radio frequency beacon.

As discussed above, while only one UAV 120 is shown in FIG. 1 for ease of illustration, it will be appreciated that in some embodiments, the computing device 140 may communicate with and/or provide flight route instructions and/or pest identifying information to two or more UAVs 120 simultaneously to guide the UAVs 120 along their predetermined routes while patrolling the crop-containing area 110 against crop-damaging pests. In some embodiments, the sensors 122 of the UAV 120 may include other flight sensors such as optical sensors and radars for detecting obstacles (e.g., other UAVs 120) to avoid collisions with such obstacles.

Figure 2:
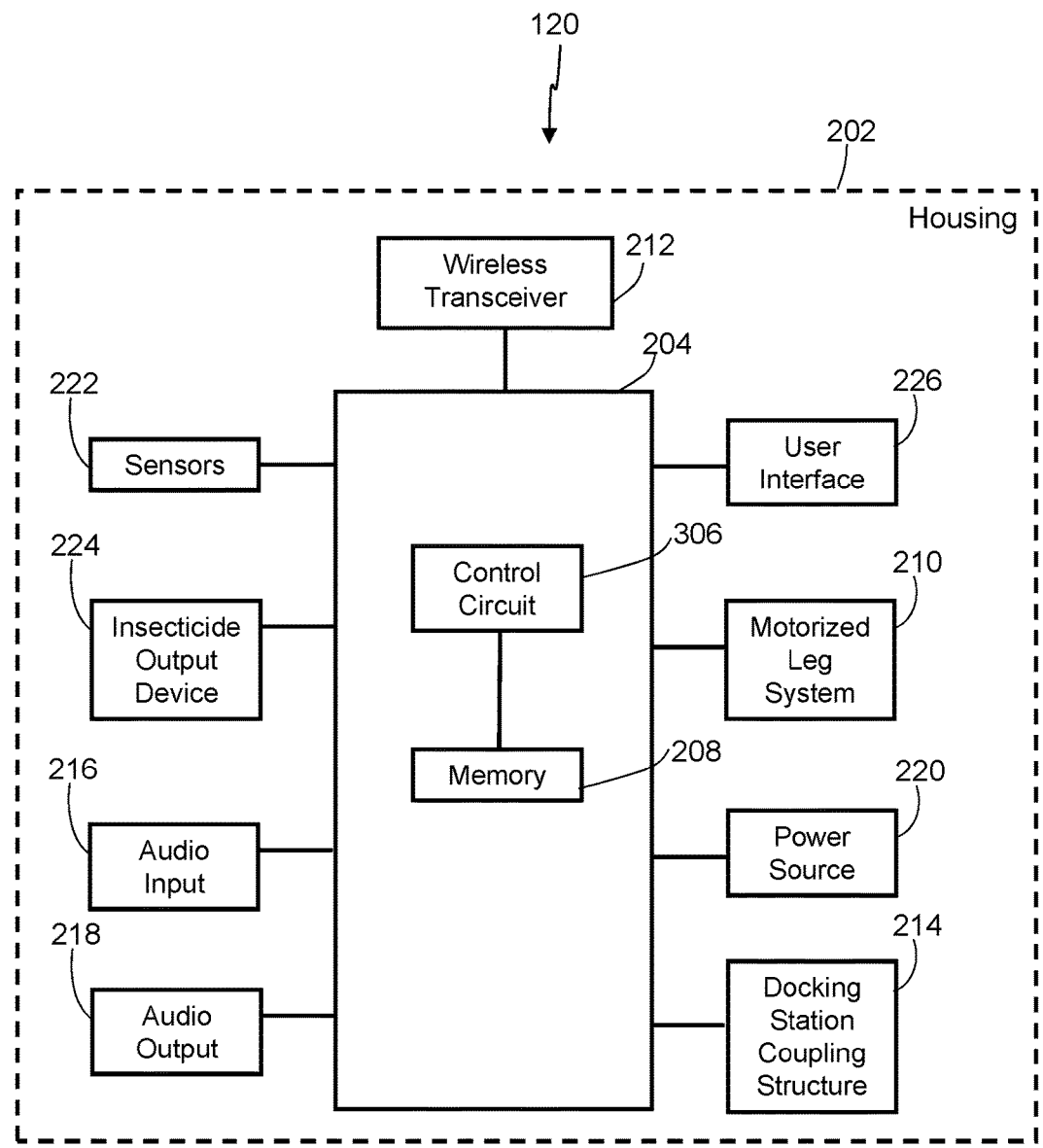
FIG. 2 comprises a block diagram of a UAV as configured in accordance with various embodiments of these teachings.

FIG. 2 presents a more detailed example of the structure of the UAV 120 of FIG. 1 according to some embodiments. The exemplary UAV 120 of FIG. 2 has a housing 202 that contains (partially or fully) or at least supports and carries a number of components. These components include a control unit 204 comprising a control circuit 206 that, like the control circuit 310 of the computing device 140, controls the general operations of the UAV 120. The control circuit 206 can comprise a fixed-purpose hard-wired platform or can comprise a partially or wholly programmable platform. These architectural options are well known and understood in the art and require no further description. The control circuit 206 is configured (e.g., by using corresponding programming stored in the memory 208 as will be well understood by those skilled in the art) to carry out one or more of the steps, actions, and/or functions described herein. The memory 208 may be integral to the control circuit 206 or can be physically discrete (in whole or in part) from the control circuit 206 as desired. This memory 208 can also be local with respect to the control circuit 206 (where, for example, both share a common circuit board, chassis, power supply, and/or housing) or can be partially or wholly remote with respect to the control circuit 206. The memory 208 can serve, for example, to non-transitorily store the computer instructions that, when executed by the control circuit 206, cause the control circuit 206 to behave as described herein.

It is noted that not all components illustrated in FIG. 2 are included in all embodiments of the UAV 120. That is, some components may be optional depending on the implementation.

The control unit 204 of the UAV 120 of FIG. 2 includes a memory 208 coupled to the control circuit 206 for storing data (e.g., pest detection data, pest identity data, instructions sent by the computing device 140, or the like). As discussed above, in some embodiments, the UAV 120 is not dependent on the electronic database 160 for storing pest identity and pest detection data and on the computing device 140 for identifying the crop-damaging pest detected by the sensor 122 and sending a control signal to the UAV 120 indicating a suitable response output by the insecticide output device 124. Instead, in some aspects, the memory 208 of the UAV 120 is configured to store both pest identity and pest detection data and the control circuit 206 of the UAV 120 is programmed to analyze the pest detection data captured by the sensors 122 of the UAV 120, identify the crop-damaging pests based on the pest detection data and the pest identity data stored as a reference point in the memory 208, determine which canister 127 of the insecticide output device 124 to deploy against the identified crop-damaging pest, and to send a control signal to the insecticide output device 124 accordingly. In some embodiments, the control circuit 206 of the UAV 120 is programmed to determine (e.g., by analyzing additional pest detection data captured by the sensor 122) that an insecticide dispensed against a crop-damaging pest was not effective, for example, due to wind or rain interference or pest resistance to the dispensed insecticide, and to determine an alternative output (e.g., different insecticide) by the insecticide output device 124, and to send a control signal to the insecticide output device 124 accordingly.

In some embodiments, the control circuit 206 of the UAV 120 operably couples to a motorized leg system 210. This motorized leg system 210 functions as a locomotion system to permit the UAV 120 to land onto the docking station 130 and/or move while on the docking station 130. Various examples of motorized leg systems are known in the art. Further elaboration in these regards is not provided here for the sake of brevity save to note that the aforementioned control circuit 206 may be configured to control the various operating states of the motorized leg system 210 to thereby control when and how the motorized leg system 210 operates.

In the exemplary embodiment of FIG. 2, the control circuit 206 operably couples to at least one wireless transceiver 212 that operates according to any known wireless protocol. This wireless transceiver 212 can comprise, for example, a cellular-compatible, Wi-Fi-compatible, and/or Bluetooth-compatible transceiver that can wirelessly communicate with the computing device 140 via the network 150. So configured, the control circuit 206 of the UAV 120 can provide information to the computing device 140 (via the network 150) and can receive information and/or movement and/or pest identification information and/or anti-pest output instructions from the computing device 140.

For example, the wireless transceiver 212 may be caused (e.g., by the control circuit 206) to transmit to the computing device 140, via the network 150, at least one signal indicating pest detection data captured by a pest-detecting sensor 122 of the UAV 120 while patrolling the crop-containing area 110. In some embodiments, the control circuit 206 receives instructions from the computing device 140 via the network 150 to dispense a pesticide via the insecticide output device 124 to kill, put to sleep, or repel a crop-damaging pest identified by the computing device 140. In one aspect, the wireless transceiver 212 is caused (e.g., by the control circuit 206) to transmit an alert to the computing device 140, or to another computing device (e.g., hand-held device of a worker at the crop-containing area 110) indicating that one or more crop-damaging pests (or animals that do not damage crops) have been detected in the crop-containing area 110. These teachings will accommodate using any of a wide variety of wireless technologies as desired and/or as may be appropriate in a given application setting. These teachings will also accommodate employing two or more different wireless transceivers 212, if desired.

The control circuit 206 also couples to one or more on-board sensors 222 of the UAV 120. These teachings will accommodate a wide variety of sensor technologies and form factors. As discussed above, the on-board sensors 222 of the UAV 120 can include sensors including but not limited to one or more sensors configured to detect the presence and/or location, in or adjacent to the crop-containing area 110, of one or more of: a crop-damaging pest; an animal that does not damage crops; a docking station 130; and other UAVs 120. Such sensors 222 can provide information (e.g., pest detection data) that the control circuit 206 and/or the computing device 140 can analyze to identify the crop-damaging pest detected by the sensors 222. For example, the UAV 120 may include an on-board sensor 222 in the form of a video camera and/or a motion sensor configured to detect movement of a crop-damaging pest in the crop-containing area 110 and capture video-based pest detection data that enables visual identification of the pest.

In some embodiments, the sensors 222 of the UAV 120 are configured to detect objects and/or obstacles (e.g., other UAVs 120, docking stations 130, birds, etc.) along the path of travel of the UAV 120. In some embodiments, using on-board sensors 222 (such as distance measurement units, e.g., laser or other optical-based distance measurement sensors), the UAV 120 may attempt to avoid obstacles, and if unable to avoid, the UAV 120 will stop until the obstacle is clear and/or notify the computing device 140 of such a condition.

By one optional approach, an audio input 216 (such as a microphone) and/or an audio output 218 (such as a speaker) can also operably couple to the control circuit 206 of the UAV 120. So configured, the control circuit 206 can provide for a variety of audible sounds to enable the UAV 120 to communicate with the docking station 130 or other UAVs 120. Such sounds can include any of a variety of tones and other non-verbal sounds.

In the embodiment of FIG. 2, the UAV 120 includes a rechargeable power source 220 such as one or more batteries. The power provided by the rechargeable power source 220 can be made available to whichever components of the UAV 120 require electrical energy. By one approach, the UAV 120 includes a plug or other electrically conductive interface that the control circuit 206 can utilize to automatically connect to an external source of electrical energy (e.g., charging dock 132 of the docking station 130) to recharge the rechargeable power source 220. By one approach, the UAV 120 may include one or more solar charging panels to prolong the flight time (or on-the-ground driving time) of the UAV 120.

These teachings will also accommodate optionally selectively and temporarily coupling the UAV 120 to the docking station 130. In such embodiments, the UAV 120 includes a docking station coupling structure 214. In one aspect, a docking station coupling structure 214 operably couples to the control circuit 206 to thereby permit the latter to control movement of the UAV 120 (e.g., via hovering and/or via the motorized leg system 210) towards a particular docking station 130 until the docking station coupling structure 214 can engage the docking station 130 to thereby temporarily physically couple the UAV 120 to the docking station 130. So coupled, the UAV 120 can recharge via a charging dock 132 of the docking station 130.

In some embodiments, the UAV 120 includes an insecticide output device 224 coupled to the control circuit 206. The insecticide output device 224 is configured to eliminate (e.g., by killing, putting to sleep, repelling, etc.) one or more pests detected by the sensors 222 from the crop-containing area 110. As discussed in more detail above with reference to the embodiment of FIG. 1, the insecticide output device 224 may include, but is not limited to, one, two, or more pesticide-containing canisters 127 each having a spray nozzle 129 and configured to release one or more insecticides specifically targeting one or more crop-damaging pest detected in the crop-containing area by the sensors 222 of the UAV 120.

In some embodiments, the UAV 120 includes a user interface 226 including for example, user inputs and/or user outputs or displays depending on the intended interaction with a user (e.g., operator of computing device 140) for purposes of, for example, manual control of the UAV 120, or diagnostics, or maintenance of the UAV 120. Some exemplary user inputs include bur are not limited to input devices such as buttons, knobs, switches, touch sensitive surfaces, display screens, and the like. Example user outputs include lights, display screens, and the like. The user interface 226 may work together with or separate from any user interface implemented at an optional user interface unit (e.g., smart phone or tablet) usable by an operator to remotely access the UAV 120. For example, in some embodiments, the UAV 120 may be controlled by a user in direct proximity to the UAV 120 (e.g., a worker at the crop-containing area 110). This is due to the architecture of some embodiments where the computing device 140 outputs the control signals to the UAV 120. These controls signals can originate at any electronic device in communication with the computing device 140. For example, the movement signals sent to the UAV 120 may be movement instructions determined by the computing device 140 and/or initially transmitted by a device of a user to the computing device 140 and in turn transmitted from the computing device 140 to the UAV 120.

A docking station 130 of FIG. 1 is generally a device configured to permit at least one or more UAVs 120 to dock thereto. The docking station 130 may be configured as an immobile station (i.e., not intended to be movable) or as a mobile station (intended to be movable on its own, e.g., via guidance from the computing device 140, or movable by way of being mounted on or coupled to a moving vehicle), and may be located in the crop-containing area 110, or outside of the crop-containing area 110. For example, in some aspects, the docking station 130 may receive instructions from the computing device 140 over the network 150 to move into a position on a predetermined route of a UAV 120 over the crop-containing area 110.

In one aspect, the docking station 130 includes at least one charging dock 132 that enables at least one UAV 120 to connect thereto and charge. In some embodiments, a UAV 120 may couple to a charging dock 132 of a docking station 130 while being supported by at least one support surface of the docking station 130. In one aspect, a support surface of the docking station 130 may include one or more of a padded layer and a foam layer configured to reduce the force of impact associated with the landing of a UAV 120 onto the support surface of the docking station 130. In some embodiments, a docking station 130 may include lights and/or guidance inputs recognizable by the sensors of the UAV 120 when located in the vicinity of the docking station 130. In some embodiments, the docking station 130 may also include one or more coupling structures configured to permit the UAV 120 to detachably couple to the docking station 130 while being coupled to a charging dock 132 of the docking station 130.

In some embodiments, the docking station 130 is configured (e.g., by including a wireless transceiver) to send a signal over the network 150 to the computing device 140 to, for example, indicate if one or more charging docks 132 of the docking station 130 are available to accommodate one or more UAVs 120. In one aspect, the docking station 130 is configured to send a signal over the network 150 to the computing device 140 to indicate a number of charging docks 132 on the docking station 130 available for UAVs 120. The control circuit 310 of the computing device 140 is programmed to guide the UAV 120 to a docking station 130 moved into position along the predetermined route of the UAV 120 and having an available charging dock 132.

In some embodiments, a docking station 130 may include lights and/or guidance inputs recognizable by the sensors of the UAV 120 when located in the vicinity of the docking station 130. In some aspects, the docking station 130 and the UAV 120 are configured to communicate with one another via the network 150 (e.g., via their respective wireless transceivers) to facilitate the landing of the UAV 120 onto the docking station 130. In other aspects, the transceiver of the docking station 130 enables the docking station 130 to communicate, via the network 150, with other docking stations 130 positioned at the crop-containing area 110.

In some embodiments, the docking station 130 may also include one or more coupling structures configured to permit the UAV 120 to detachably couple to the docking station 130 while being coupled to a charging dock 132 of the docking station 130. In one aspect, the UAV 120 is configured to transmit signals to and receive signals from the computing device 140 over the network 150 only when docked at the docking station 130. For example, in some embodiments, after the crop-damaging pest detected by the UAV 120 in the crop-containing area 110 is identified by the computing device 140, the UAV 120 is configured to receive a signal from the computing device 140 containing an identification of this pest and/or instructions as to how the insecticide output device 124 of the UAV 120 is to respond to the crop-damaging pest only when the UAV 120 is docked at the docking station 130. In other embodiments, the UAV 120 is configured to communicate with the computing device 140 and receive pest identification data and/or pest response instructions from the computing device 140 over the network 150 while the UAV 120 is not docked at the docking station 130.

In some embodiments, the docking station 130 may be configured to not only recharge the UAV 120, but also to re-equip the insecticide output device 124 of the UAV 120, and/or to add modular external components to the UAV 120. For example, in some embodiments, the docking station 130 is configured to refill, replace, and/or add one or more insecticide canisters 127 of the insecticide output device 124 of the UAV 120. In some embodiments, the docking station 130 is configured to provide for addition of new modular components to the insecticide output device 124 of the UAV 120 (e.g., the above-discussed bug zapper for trapping and killing the crop-damaging pest, a device for releasing mammals, insects, or reptiles that are predators relative to the crop-damaging, etc.) to expand the capabilities of the insecticide output device 124 of the UAV 120 to kill, put to sleep, or repel a crop-damaging pest that the insecticide output device 124 of the UAV 120 was not previously equipped to kill, put to sleep, or repel.

In some embodiments, the docking station 130 may itself be equipped with an insecticide output device akin to the insecticide output device 124 of the UAV 120 to enable the docking station 130 to dispense one or more insecticides configured to eliminate (e.g., kill, put to sleep, or repel) one or more crop-damaging pests from the crop-containing area 110. As such, in some aspects of the system 100, anti-pest insecticides can be dispensed not only by the UAV 120, but also by the docking station 130, thereby advantageously increasing the anti-pest capabilities of the system 100.

In some embodiments, the docking station 130 is configured to provide for the addition of new modular components to the UAV 120 to enable the UAV 120 to better interact with the operating environment where the crop-containing area 110 is located. For example, in some aspects, the docking station 130 is configured to enable the coupling of various types of landing gear to the UAV 120 to optimize the ground interaction of the UAV 120 with the docking station 130 and/or to optimize the ability of the UAV 120 to land on the ground in the crop-containing area 110. In some embodiments, the docking station 130 is configured to enable the coupling of new modular components (e.g., rafts, pontoons, sails, or the like) to the UAV 120 to enable the UAV 120 to land on and/or move on wet surfaces and/or water. In some embodiments, the docking station 130 may be configured to enable modifications of the visual appearance of the UAV 120, for example, via coupling, to the exterior body of the UAV 120, one or more modular components (e.g., wings) designed to, for example, prolong the flight time of the UAV 120. It will be appreciated that the relative sizes and proportions of the docking station 130 and UAV 120 are not drawn to scale.

The computing device 140 of the exemplary system 100 of FIG. 1 may be a stationary or portable electronic device, for example, a desktop computer, a laptop computer, a tablet, a mobile phone, or any other electronic device. In some embodiments, the computing device 140 may comprise a control circuit, a central processing unit, a processor, a microprocessor, and the like, and may be one or more of a server, a computing system including more than one computing device, a retail computer system, a cloud-based computer system, and the like. Generally, the computing device 140 may be any processor-based device configured to communicate with the UAV 120, docking station 130, and electronic database 160 in order to guide the UAV 120 as it patrols the crop-containing area 110 and/or docks to a docking station 130 (e.g., to recharge) and/or deploys from the docking station 130 and/or generates an output designed to eliminate a pest from the crop-containing area 110.

The computing device 140 may include a processor configured to execute computer readable instructions stored on a computer readable storage memory. The computing device 140 may generally be configured to cause the UAVs 120 to: travel (e.g., fly, hover, or drive) around the crop-containing area 110, along a route determined by a control circuit of the computing device 140; detect the docking station 130 positioned along the route predetermined by the computing device 140; land on and/or dock to the docking station 130; undock from and/or lift off the docking station 130; detect one or more crop-damaging pests in the crop-containing area 110; and/or generate an output (e.g., via the insecticide output device 124) configured to eliminate one or more crop-damaging pests from the crop-containing area 110. In some embodiments, the electronic database 160 includes pest identity data associated with crop-damaging pests to facilitate identification of the crop-damaging pests by the computing device 140, and the computing device 140 is configured to determine the identity of a pest based on the pest identity data retrieved from the electronic database 160 and the pest detection data captured by the sensors 122 of the UAV 120, and to instruct the UAV 120 to dispense an insecticide specific to the detected pest based on the identification of that pest by the computing device 140. In such embodiments, the pest identity data is stored remotely to the UAV 120 and the determination of the identity of the pest based on the pest detection data is made remotely (at computing device 140) to the UAV 120, thereby advantageously reducing the data storage and processing power requirements of the UAV 120.

Figure 3:
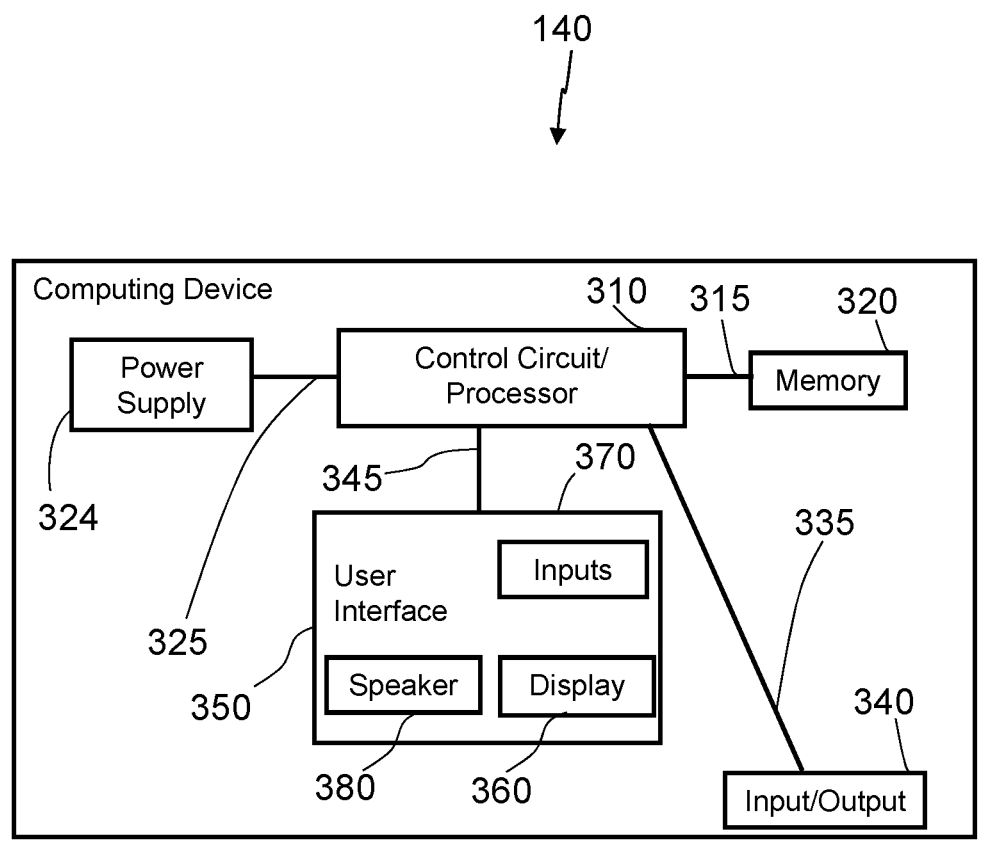
FIG. 3 is a functional block diagram of a computing device in accordance with some embodiments.

With reference to FIG. 3, a computing device 140 according to some embodiments configured for use with exemplary systems and methods described herein may include a control circuit 310 including a processor (e.g., a microprocessor or a microcontroller) electrically coupled via a connection 315 to a memory 320 and via a connection 325 to a power supply 330. The control circuit 310 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

The control circuit 310 can be configured (for example, by using corresponding programming stored in the memory 320 as will be well understood by those skilled in the art) to carry out one or more of the steps, actions, and/or functions described herein. In some embodiments, the memory 320 may be integral to the processor-based control circuit 310 or can be physically discrete (in whole or in part) from the control circuit 310 and is configured non-transitorily store the computer instructions that, when executed by the control circuit 310, cause the control circuit 310 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control circuit may be referred to as a non-transitory medium or non-transitory computer readable medium.

In some embodiments, the control circuit 310 of the computing device 140 is programmed to, in response to receipt (via the network 150) of pest damage data (captured by the sensor 122 of the UAV 120) from the UAV 120, cause the computing device 140 to access, via the network 150, the pest damage identity data stored on the electronic database 160 to determine an identity of the pest detected by the sensor 122 of the UAV 120. In some aspects, the control circuit 310 of the computing device is configured to transmit, over the network 150, the pest detection data received from the UAV 120 to the electronic database 160, such that the electronic database 160 can be updated in real time to include up-to-date information relating to types crop-damaging pests detected in the crop-containing area 110.

In one aspect, the control circuit 310 of the computing device 140 is programmed to determine an identity of one or more pest in the crop-containing area 110 based on the pest detection data (captured by, and received from, the UAV 120) and the pest damage identity data stored in the electronic database 160. Specifically, in some embodiments, the control circuit 310 of the computing device 140 is configured to access, via the network 150, the pest damage identity data stored on the electronic database 160 and to compare the pest damage identity data and the pest detection data to determine the identity of one or more crop-damaging pests detected in the crop-containing area 110. In some aspects, the control unit 310 of the computing device 140 is configured to compare the pest damage identity data stored in the electronic database 160 to the pest damage data that is captured by the UAV 120 to find a pest in the pest identity data having visual characteristics that match the visual characteristics of the pest detected by the UAV 120 on the crops in the crop-containing area 110 in order to identify the pest detected by the UAV 120.

In some embodiments, the control circuit 310 of the computing device 140 is programmed to generate a control signal to the UAV 120 based on a determination of the identity of the pest by the control circuit 310 of the computing device 140. For example, such a control signal may instruct the UAV 120 to move in a way that would scare or herd the identified pest away from the crop-containing area 110, to emit a noise designed to scare the identified pest away from the crop-containing area 110, to release a chemical that would scare or herd the identified pest away from the crop-containing area 110, and/or to release a chemical that would kill the identified pest. In some aspects, the control circuit 310 is programmed to cause the computing device 140 to transmit such control signal to the UAV 120 over the network 150.

The control circuit 310 of the computing device 140 is also electrically coupled via a connection 335 to an input/output 340 (e.g., wireless interface) that can receive wired or wireless signals from one or more UAVs 120. Also, the input/output 340 of the computing device 140 can send signals to the UAV 120, such as signals including instructions indicating an identity of a crop-damaging pest detected by the UAV 120 and/or how the insecticide output device 124 of the UAV 120 is to respond to a specific identified pest, or which docking station 130 the UAV 120 is to land on for recharging while patrolling the crop-containing area 110 along a route predetermined by the computing device 140.

In the embodiment shown in FIG. 3, the processor-based control circuit 310 of the computing device 140 is electrically coupled via a connection 345 to a user interface 350, which may include a visual display or display screen 360 (e.g., LED screen) and/or button input 370 that provide the user interface 350 with the ability to permit an operator of the computing device 140, to manually control the computing device 140 by inputting commands via touch-screen and/or button operation and/or voice commands to, for example, to send a signal to the UAV 120 in order to, for example: control directional movement of the UAV 120 while the UAV 120 is moving along a (flight or ground) route (over or on the crop-containing area 110) predetermined by the computing device 140; control movement of the UAV 120 while the UAV 120 is landing onto a docking station 130; control movement of the UAV 120 while the UAV is lifting off a docking station 130; control movement of the UAV 120 while the UAV 120 is in the process of dispensing one or more insecticides from the insecticide output device 124; and/or control which insecticide the insecticide output device 124 of the UAV 120 releases in response to detection of a crop-damaging pest in the crop-containing area 110. Notably, the performance of such functions by the processor-based control circuit 310 of the computing device 140 is not dependent on actions of a human operator, and that the control circuit 310 may be programmed to perform such functions without being actively controlled by a human operator.

In some embodiments, the display screen 360 of the computing device 140 is configured to display various graphical interface-based menus, options, and/or alerts that may be transmitted from and/or to the computing device 140 in connection with various aspects of movement of the UAV 120 in the crop-containing area 110 as well as with various aspects of the anti-pest response generated by the insecticide output device 124 of the UAV 120 in response to the instructions received from the computing device 140. The inputs 370 of the computing device 140 may be configured to permit a human operator to navigate through the on-screen menus on the computing device 140 and make changes and/or updates to the routes of the UAV 120, anti-pest outputs of the insecticide output device 124, and/or the locations of the docking stations 130. It will be appreciated that the display screen 360 may be configured as both a display screen and an input 370 (e.g., a touch-screen that permits an operator to press on the display screen 360 to enter text and/or execute commands.) In some embodiments, the inputs 370 of the user interface 350 of the computing device 140 may permit an operator to, for example, enter an identity of a pest detected in the crop-containing area 110 and to configure instructions to the UAV 120 for outputting a specific response via the insecticide output device 124 to the identified pest.

In some embodiments, the computing device 140 automatically generates a travel route for the UAV 120 from its deployment station to the crop-containing area 110, and to or from the docking station 130 while moving over or on the crop-containing area 110. In some embodiments, this route is based on a starting location of a UAV 120 (e.g., location of deployment station) and the intended destination of the UAV 120 (e.g., location of the crop-containing area 110, and/or location of docking stations 130 in or around the crop-containing area 110).

The electronic database 160 of FIG. 1 is configured to store electronic data including, but not limited to: pest detection data captured by the UAV 120 upon detecting one or more crop-damaging pests in the crop-containing area 110; pest identity data associated with the crop-damaging pests to facilitate identification of the crop-damaging pests by the computing device 140; data indicating location of the UAV 120 (e.g., GPS coordinates, etc.); data indicating anti-pest output capabilities (e.g., number of on-board canisters 127, level of insecticide in the canisters 127, etc.) of the insecticide output device 124 of the UAV 120 (e.g., to facilitate addition of new module output components providing further anti-pest capabilities); data indicating anti-pest outputs deployed by the insecticide output device 124 of the UAV 120; route of the UAV 120 from a deployment station to the crop-containing area 110; route of the UAV 120 while patrolling the crop-containing area 110; route of the UAV 120 when returning from the crop-containing area 110 to the deployment station; data indicating communication signals and/or messages sent between the computing device 140, UAV 120, electronic database 160, and/or docking station 130; data indicating location (e.g., GPS coordinates, etc.) of the docking station 130; and/or data indicating identity of one or more UAVs 120 docked at each docking station 130. As discussed above, in some embodiments, such electronic data is stored in the memory 208 of the UAV 120, such that the control circuit 206 of the UAV 120 accesses such electronic data from the memory 208 of the UAV 120 without having to access a remote electronic database over the network 150.

In some embodiments, location inputs are provided via the network 150 to the computing device 140 to enable the computing device 140 to determine the location of one or more of the UAVs 120 and/or one or more docking stations 130. For example, in some embodiments, the UAV 120 and/or docking station 130 may include a GPS tracking device that permits a GPS-based identification of the location of the UAV 120 and/or docking station 130 by the computing device 140 via the network 150. In one aspect, the computing device 140 is configured to track the location of the UAV 120 and docking station 130, and to determine, via the control circuit 310, an optimal route for the UAV 120 from its deployment station to the crop-containing area 110 and/or an optimal docking station 130 for the UAV 120 to dock to while traveling along its predetermined route. In some embodiments, the control circuit 310 of the computing device 140 is programmed to cause the computing device 140 to communicate such tracking and/or routing data to the electronic database 160 for storage and/or later retrieval.

In view of the above description referring to FIGS. 1-3, and with reference to FIG. 4, a method 400 of defending a crop-containing area 110 against crop-damaging pests according to some embodiments will now be described. While the process 400 is discussed as it applies to dispensing an insecticide to defend a crop-containing area 110 against crop-damaging pests via one or more UAVs 120 and docking stations 130 as shown in FIG. 1, it will be appreciated that the process 400 may be utilized in connection with any of the embodiments described herein.

Figure 4:
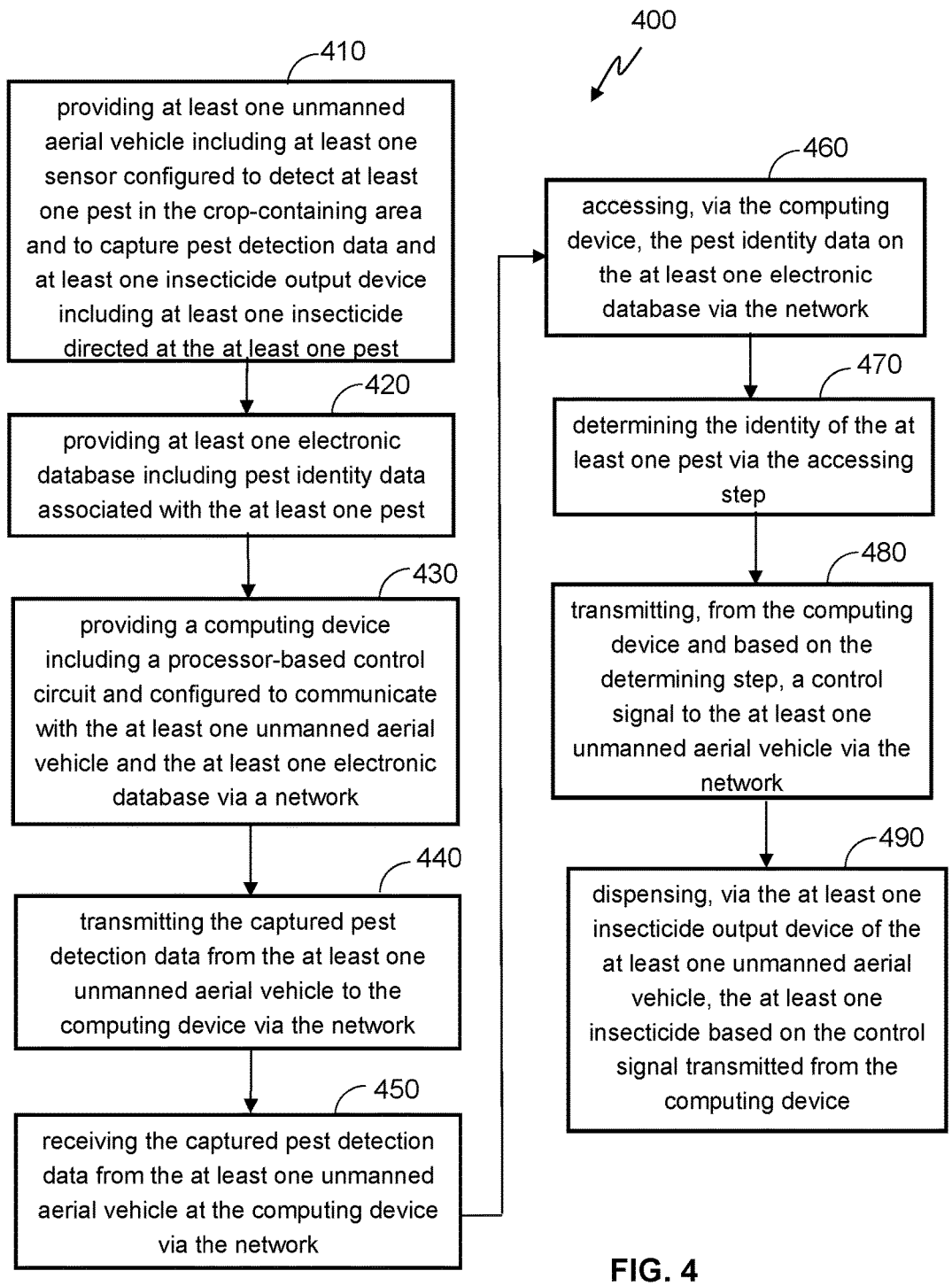
FIG. 4 is a flow diagram of a method of dispensing an insecticide via unmanned vehicles to defend a crop-containing area against crop-damaging pests in accordance with some embodiments.

The exemplary method 400 depicted in FIG. 4 providing one or more UAVs 120 including one or more sensors 122 configured to detect one or more crop-damaging pests in the crop-containing area 110 and to capture pest detection data and including one or more insecticide output devices 124 having one or more insecticides directed at one or more crop-damaging pests (step 410). The method 400 also includes providing one or more electronic databases 160 including pest identity data associated with one or more pests (step 420) and providing a computing device 140 including a processor-based control circuit 310 and configured to communicate with the UAV 120 and the electronic database 160 via a network 150 (step 430). The electronic database 160 and the computing device 140 were both described in detail above.

In some embodiments, the method 400 includes providing one or more docking stations 130 positioned proximate (e.g., within, adjacent to, or remote to) the crop-containing area 110 and configured to accommodate one or more UAVs 120. As discussed above, in some embodiments, the docking stations 130 are configured to provide for recharging of the UAVs 120, replenishment of various components of the insecticide output device 124 of the UAV 120, and/or addition of modular components configured to expand the anti-pest capabilities of the UAV 120, or to facilitate better interaction of the UAV 120 with its surrounding environment.

The method 400 of FIG. 4 also includes transmitting the pest detection data captured by the sensors 122 of the UAV 120 from the UAV 120 to the computing device 140 via the network 150 (step 440). As discussed above, the crop-damaging pests may be insects, birds, and/or animals capable of damaging the crops in the crop-containing area 110, and the UAV 120 can detect such pests via a sensor 122 configured to capture the pest detection data. The method 400 of FIG. 4 further includes receiving the captured pest detection data from the UAV 120 at the computing device 140 via the network 150 (step 450).

In some embodiments, after the pest detection data captured by the sensor 122 of the UAV 120 and transmitted by the UAV 120 over the network 150 is received by the computing device 140, and in one aspect, forwarded by the computing device 140 to the electronic database 160, the method 400 includes accessing, via the computing device 140 and over the network 150, the pest identity data stored on the electronic database 160 (step 460) and determining the identity of the crop-damaging pest via the accessing step (step 470). As discussed above, the determination of the identity of the crop-damaging pest may be made remotely to the UAV 120 by the control circuit 310 of the computing device 140 based on pest detection data and pest identity data stored on the electronic database 160, or may be made by the control circuit 206 of the UAV 120 based on pest detection data and pest identity data stored in the memory 208 of the UAV 120.

After the identity of the crop-damaging pest is determined, the method 400 further includes transmitting, from the computing device 140 and based on the determining step, a control signal to the UAV 120 via the network 150 (step 480). After the control signal is received from the computing device 140 over the network 150 by the UAV 120, the method 400 of FIG. 4 further includes dispensing, via the insecticide output device 124 of the UAV 120, one or more insecticides based on the instructions received in the control signal transmitted from the computing device 140 (step 490). For example, as discussed above, the control signal received by the UAV 120 from the computing device 140 may instruct the insecticide output device 124 to dispense one or more insecticides that are specifically toxic to one or more pests detected by the UAV 120 and identified by the computing device 140. As discussed above, in some embodiments, instead of relying on a control signal to be sent from the computing device, the method 400 includes generating a control signal that controls the anti-pest output of the insecticide output device 124 at the UAV 120 via the control circuit 206.

The systems and methods described herein advantageously provide for semi-automated or fully automated monitoring of crop-containing areas via unmanned vehicles to detect one or more crop-damaging pests in the crop-containing areas and to eliminate the pests from the crop-containing areas using the unmanned vehicles while enabling the recharging of such vehicles to advantageously provide for substantially continuous monitoring and protection of crop-containing areas against crop-damaging pests. As such, the present systems and methods significantly reduce the resources needed to protect crop-containing areas from pests and provide for specifically targeted insecticide outputs, thereby advantageously providing a more efficient anti-pest system and significant cost savings to the keepers of the crop-containing areas.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for dispensing an insecticide to defend a crop-containing area against crop-damaging pests, the system comprising:
at least one unmanned aerial vehicle including:
at least one sensor configured to detect at least one pest in the crop-containing area and to capture pest detection data; and
at least one insecticide output device including at least one insecticide directed at the at least one pest;
at least one electronic database including pest identity data associated with the at least one pest; and
a computing device including a processor-based control circuit and configured to communicate with the at least one unmanned aerial vehicle and the at least one electronic database via a network;
wherein the at least one unmanned aerial vehicle is configured to transmit the captured pest detection data via the network to the computing device;
wherein, in response to receipt of the captured pest detection data via the network from the at least one unmanned aerial vehicle, the computing device is configured to access the pest identity data on the at least one electronic database via the network to determine an identity of the at least one pest; and
wherein the computing device is configured to transmit, based on the determined identity of the at least one pest by the computing device, a control signal to the at least one unmanned aerial vehicle via the network, the control signal configured to cause the at least one insecticide output device of the at least one unmanned aerial vehicle to dispense the at least one insecticide.

2. The system of claim 1, wherein the at least one sensor of the at least one unmanned aerial vehicle includes a video camera configured to detect presence of the at least one pest in the crop-containing area and to capture the pest detection data.

3. The system of claim 1, wherein the at least one sensor of the at least one unmanned aerial vehicle is configured to capture sound data representing at least one sound emitted by the at least one pest.

4. The system of claim 1, wherein the at least one sensor of the at least one unmanned aerial vehicle includes an odor sensor configured to detect at least one of an odor emitted by the at least one pest and droppings generated by the at least one pest.

5. The system of claim 1, wherein the at least one sensor of the at least one unmanned aerial vehicle is at least one of a radar-enabled sensor configured to detect movement of the at least one pest outside of the crop-containing area and a motion detection-enabled sensor configured to detect movement of the at least one pest in the crop-containing area.

6. The system of claim 1, wherein the control circuit of the computing device is configured to compare the captured pest detection data received at the computing device from the at least one unmanned aerial vehicle and the pest identity data stored in the at least one electronic database to determine the identity of the at least one pest detected by the at least one sensor of the at least one unmanned aerial vehicle.

7. The system of claim 1, wherein the at least one insecticide output device includes at least one canister configured to hold at least one chemical adapted to one of: drive the at least one pest identified by the computing device away from the crop-containing area upon release of the at least one chemical from the at least one canister; put the at least one pest identified by the computing device to sleep upon release of the at least one chemical from the at least one canister; and kill the at least one pest identified by the computing device upon release of the at least one chemical from the at least one canister.

8. The system of claim 7, wherein the at least one insecticide output device includes at least one dispenser nozzle in fluid communication with the at least one canister and configured to dispense the at least one chemical from the at least one canister in response to receipt by the at least one unmanned aerial vehicle of the control signal from the computing device.

9. The system of claim 1,
wherein the at least one insecticide output device includes a first chemical toxic to the at least one pest identified by the computing device and a second chemical not toxic to the at least one pest identified by the computing device; and
wherein the control signal is configured to cause the at least one insecticide output device of the at least one unmanned aerial vehicle to dispense the first chemical without dispensing the second chemical.

10. The system of claim 1,
wherein the control circuit of the computing device is configured to determine an identity of at least a first pest and of at least a second pest based on the captured pest detection data received at the computing device from the at least one unmanned aerial vehicle and the pest identity data stored in the at least one electronic database; and
wherein the control circuit of the computing device is configured to generate a control signal configured to cause the at least one insecticide output device of the at least one unmanned aerial vehicle to dispense at least two insecticides, a first of the insecticides being directed at the first pest and the second insecticide being directed at the second pest.

11. A method of dispensing an insecticide to defend a crop-containing area against crop-damaging pests, the method comprising:
providing at least one unmanned aerial vehicle including at least one sensor configured to detect at least one pest in the crop-containing area and to capture pest detection data and at least one insecticide output device including at least one insecticide directed at the at least one pest;
providing at least one electronic database including pest identity data associated with the at least one pest;
providing a computing device including a processor-based control circuit and configured to communicate with the at least one unmanned aerial vehicle and the at least one electronic database via a network;
transmitting the captured pest detection data from the at least one unmanned aerial vehicle to the computing device via the network;
receiving the captured pest detection data from the at least one unmanned aerial vehicle at the computing device via the network;
accessing, via the computing device, the pest identity data on the at least one electronic database via the network;
determining the identity of the at least one pest via the accessing step;
transmitting, from the computing device and based on the determining step, a control signal to the at least one unmanned aerial vehicle via the network; and
dispensing, via the at least one insecticide output device of the at least one unmanned aerial vehicle, the at least one insecticide based on the control signal transmitted from the computing device.

12. The method of claim 11, wherein the step of providing at least one unmanned aerial vehicle including at least one sensor includes providing the at least one sensor with a video camera configured to detect presence of the at least one pest in the crop-containing area and to capture the pest detection data.

13. The method of claim 11, wherein the step of providing at least one unmanned aerial vehicle including at least one sensor includes configuring the at least one sensor to capture sound data representing at least one sound emitted by the at least one pest.

14. The method of claim 11, wherein the step of providing at least one unmanned aerial vehicle including at least one sensor includes configuring the at least one sensor to detect at least one of an odor emitted by the at least one pest and droppings generated by the at least one pest.

15. The method of claim 11, wherein the step of providing at least one unmanned aerial vehicle including at least one sensor includes providing one of a radar-enabled sensor configured to detect movement of the at least one pest outside of the crop-containing area and a motion detection-enabled sensor configured to detect movement of the at least one pest in the crop-containing area.

16. The method of claim 11, wherein the determining step further comprises comparing, via the control circuit of the computing device, the captured pest detection data received at the computing device from the at least one unmanned aerial vehicle and the pest identity data stored in the at least one electronic database.

17. The method of claim 11, wherein the providing at least one unmanned aerial vehicle step further comprises providing the at least one insecticide output device with at least one canister configured to hold at least one chemical adapted to one of: drive the at least one pest identified by the computing device away from the crop-containing area upon release of the at least one chemical from the at least one canister; put the at least one pest identified by the computing device to sleep upon release of the at least one chemical from the at least one canister; and kill the at least one pest identified by the computing device upon release of the at least one chemical from the at least one canister.

18. The method of claim 17, wherein the step of providing the at least one insecticide output device with at least one canister further comprises providing at least one dispenser nozzle in fluid communication with the at least one canister and configured to dispense the at least one chemical from the at least one canister in response to receipt by the at least one unmanned aerial vehicle of the control signal from the computing device.

19. The method of claim 11, wherein the step of providing at least one unmanned aerial vehicle further comprises providing the at least one insecticide output device with a first chemical toxic to the at least one pest identified by the computing device and a second chemical not toxic to the at least one pest identified by the computing device, and further comprising causing, via the control signal, the at least one insecticide output device of the at least one unmanned aerial vehicle to dispense the first chemical without dispensing the second chemical.

20. The method of claim 11, wherein the determining step further comprises determining, via the control circuit of the computing device, an identity of at least a first pest and of at least a second pest based on the captured pest detection data received at the computing device from the at least one unmanned aerial vehicle and the pest identity data stored in the at least one electronic database, and further comprising generating, via the control circuit of the computing device, a control signal configured to cause the at least one insecticide output device of the at least one unmanned aerial vehicle to dispense at least two insecticides, a first of the insecticides being directed at the first pest and the second insecticide being directed at the second pest.

* * * * *